United States Patent [19]

Krop

[11] Patent Number: 4,831,293

[45] Date of Patent: May 16, 1989

[54] LOW POWER, STEPPING MOTOR WITH DISPLAY

[75] Inventor: Hugo K. Krop, Loosdrecht, Netherlands

[73] Assignee: Text Lite B.V., Amsterdam, Netherlands

[21] Appl. No.: 56,403

[22] Filed: May 29, 1987

[30] Foreign Application Priority Data

Jun. 3, 1986 [NL] Netherlands ......................... 8601422

[51] Int. Cl.⁴ ....................... H02K 3/38; H02K 37/14; G08B 5/22; G01R 11/30
[52] U.S. Cl. .................................. 310/49 R; 310/208; 324/146; 336/188
[58] Field of Search .............. 310/40 MM, 49 R, 162, 310/208, 254, 256; 324/207, 208, 247; 335/272; 340/764, 783, 815.08, 815.09

[56] References Cited

U.S. PATENT DOCUMENTS

| | | |
|---|---|---|
| 3,168,689 | 2/1965 | Gelenius ........................... 310/49 R |
| 3,350,709 | 10/1967 | Pursiano et al. ................. 310/49 R |
| 3,747,320 | 7/1973 | Vuffray ............................... 310/156 |
| 3,766,549 | 10/1973 | Kulka et al. .................... 340/378 R |
| 4,319,823 | 3/1982 | Hashimoto .......................... 335/272 |

FOREIGN PATENT DOCUMENTS

| | | |
|---|---|---|
| PF5244 | 8/1982 | Australia . |
| 2942306 | 5/1981 | Fed. Rep. of Germany . |
| 1299574 | 6/1962 | France ................................ 310/162 |

Primary Examiner—Patrick R. Salce
Assistant Examiner—D. L. Rebsch
Attorney, Agent, or Firm—Majestic, Parsons, Siebert & Hsue

[57] ABSTRACT

A stepping motor with a permanently magnetized rotor disc mounted on a shaft and with at least one air-core coil for the excitation of a magnetic field. Each coil has been wound in a plane in which the normal to the windings of each coil is perpendicular to the rotor shaft, and in which the rotor disc intersects each coilwinding plane.

15 Claims, 5 Drawing Sheets

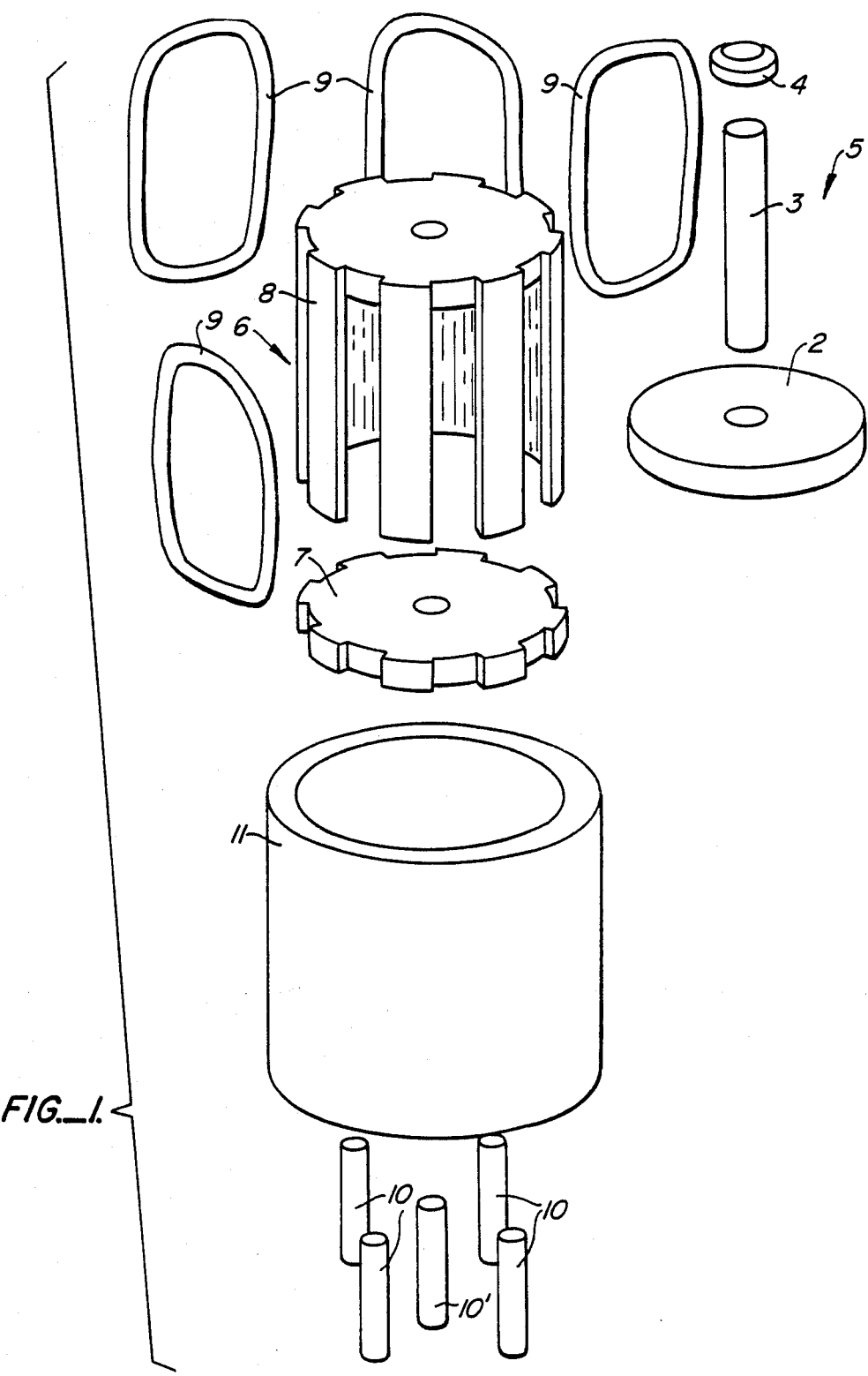
FIG._1.

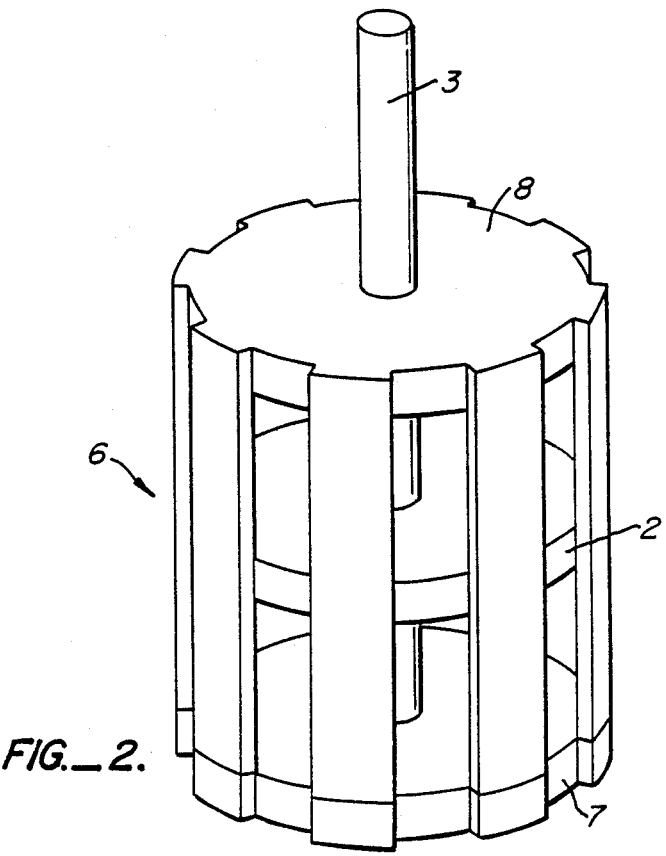
FIG._2.
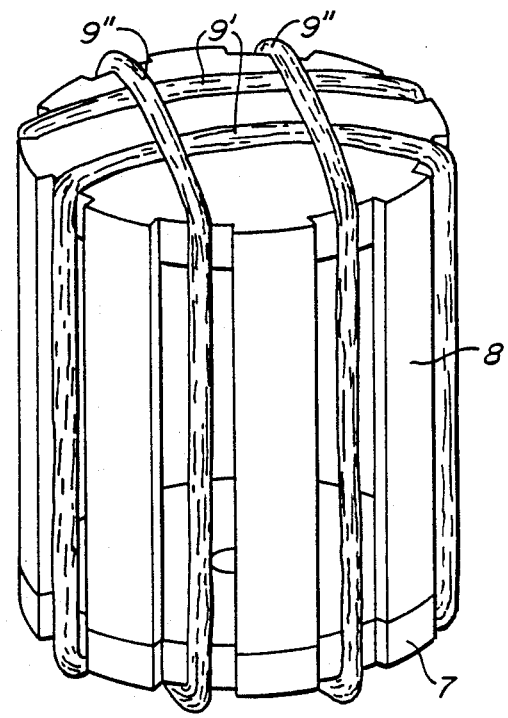
FIG._3.

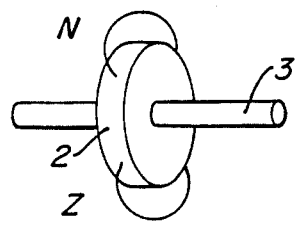
FIG._4.
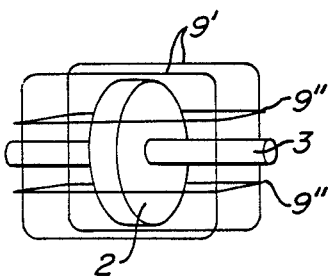
FIG._5.
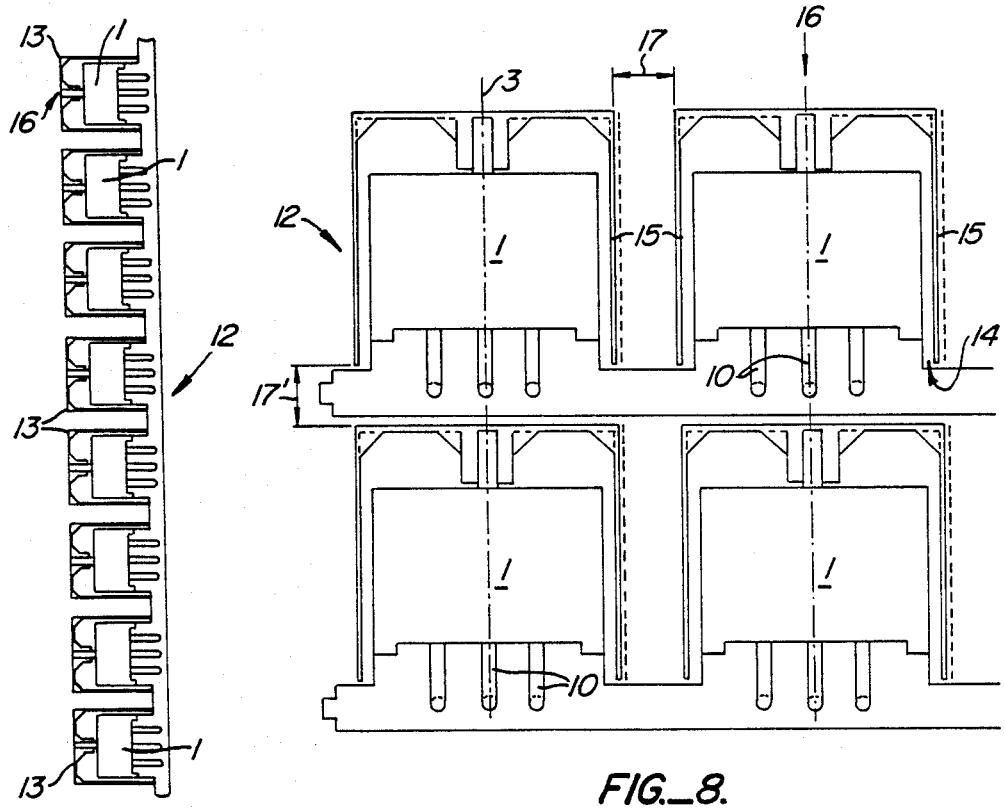
FIG._7.
FIG._8.

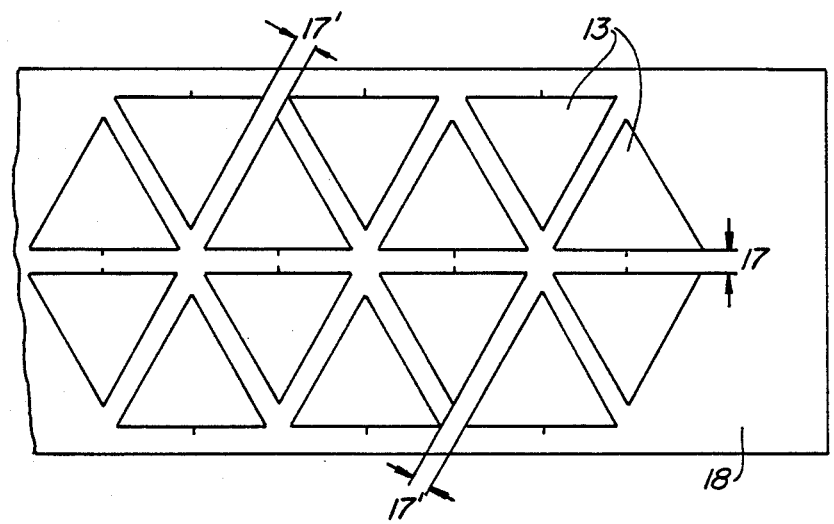
FIG._9.
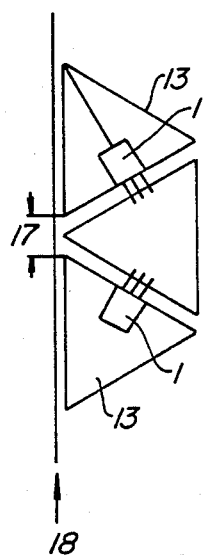
FIG._10.

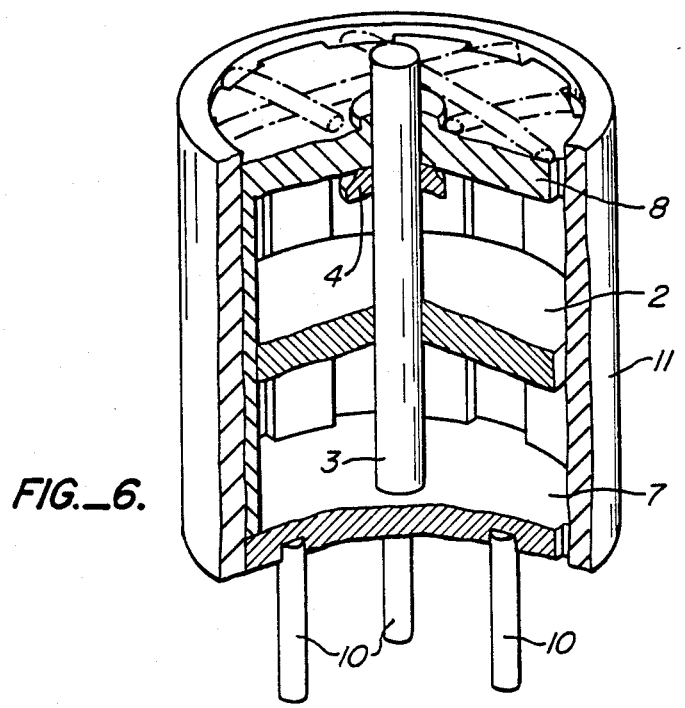
FIG._6.
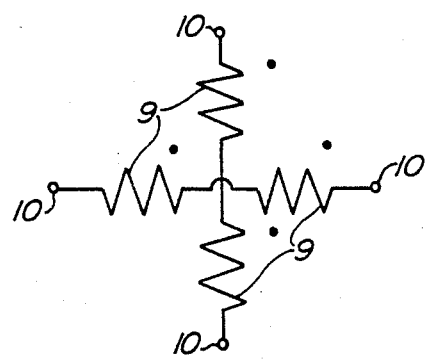
FIG._11.
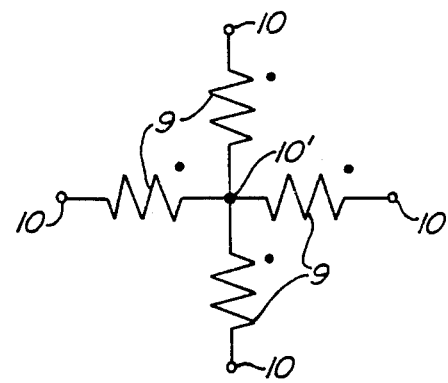
FIG._12.

LOW POWER, STEPPING MOTOR WITH DISPLAY

The invention relates to a stepping motor provided with a permanently magnetized rotor disc mounted on a shaft and with at least one coil for the excitation of a magnetic field, as well as to a display provided with such stepping motors.

Stepping motors of the said type are known in the art and employed in a wide range of applications. Thus, numerically controlled machining appliances would become far more complicated but for the use of stepping motors, whilst many servo mechanisms are also based on the use of stepping motors.

As, however, the permanently magnetized rotor disc must have some volume in order to command a sufficiently strong magnetic field and as the coils in the known stepping motors are disposed in cylindrical array round the rotor, it is exceedingly difficult to manufacture very small stepping motors.

It is an object of the present invention to provide a stepping motor whose dimensions can be smaller than those of the known stepping motors. This object has been achieved by a motor design in which each coil has been wound in a plane, in which the normal to the windings of each coil is perpendicular to the rotor spindle, and in which the rotor disc intersects each coil-winding plane. This design makes it possible to construct a stepping motor with very small control-current intensities and a minimum of magnetic and coil-core material, because the rotor disc itself acts simultaneously as armature and magnetic core. A factor contributing to this result is the use of air-core coils.

The great advantage presented by the possibility of designing still smaller stepping motors consists in the opening-up of countless new applications and the further miniaturization of existing systems, for instance in measurement and control. Because of the low control-current intensity required, only minimal power is consumed.

A further advantage is that stepping motors according to the invention can be controlled directly by a computer, because the power supply to the stepping motor can be adjusted without any amplification to the output signal of the computer.

As the rotor and the coils are surrounded by an annular soft-iron casing, the stepping motor according to the invention has virtually no external stray field, whilst the soft iron deflects the magnetic field to a shape affording maximum efficiency.

Some embodiments of a stepping motor and displays according to the invention will now be elucidated with reference to the accompanying drawings, in which:

FIG. 1 is an exploded view of a stepping motor according to the invention;

FIG. 2 depicts the assembled cage construction according to FIG. 1 within which the assembled rotor is accommodated;

FIG. 3 depicts a cage construction according to figure 1 provided with coils;

FIG. 4 is a schematic view showing the orientation of the poles in the rotor according to FIG. 1;

FIG. 5 schematically shows the orientation of the coils according to FIG. 1;

FIG. 6 is a cut-away section of the stepping motor according to FIG. 1 as assembled;

FIG. 7 is a section of part of a display according to the invention;

FIG. 8 is another section of part of a display according to FIG. 7;

FIG. 9 depicts an alternative display according to the invention;

FIG. 10 is a sectional view of the display according to FIG. 9; and

FIGS. 11 and 12 represent electric circuits.

FIG. 1 represents an embodiment of a stepping motor according to the invention in exploded view, the stepping motor 1 being composed of
  a disc-shaped permanent magnet 2
  a shaft 3
  an end collar 4,
together constituting the rotor 5,
  a segmental disc 7
  a finger disc 8,
together constituting a cylindrical cage construction 6 which is disposed concentrically round the rotor 5 and about which cage construction 6 a number of coils 9 have been wound, as well as
  connecting plugs 10, 10' and
  a soft-iron casing.

The assembled cage construction 6, without coils 9 but with the assembled rotor 5, is represented in FIG. 2; the assembled cage construction 6, with coils 9 but without rotor 5 and connecting plugs 10, 10', is depicted in FIG. 3.

In the embodiment presented the disc-shaped permanent magnet 2 is diagonally magnetized, as shown in FIG. 4. Now, by positioning the coils 9 in the orientation of FIG. 5, a 90° stepping motor can be obtained if at any time only one pair of coils 9', 9", with which the coils 9 have been connected in parallel, is energized, but it is also possible to obtain a 45° stepping motor, if one pair of coils or both pairs of coils 9', 9", with which the coils 9 have been connected in parallel, are energized, or if the coils 9 with the pairs of coils 9', 9" are energized independently of one another. This last facility, however, requires one additional connection.

The assembled stepping motor 1 according to the example here given is diagrammatically shown in FIG. 6. By adjustment of the number of magnetic poles and the number of coils 9, it is equally possible to obtain other types of stepping motors according to the invention such as, for instance, 120° or 180° stepping motors.

The coils 9 are preferably present in an even number and disposed two by two in parallel with one another on both sides of the rotor shaft 3, whilst the coil pairs 9', 9" are symmetrically spaced around the 360° circumference encircling the rotor shaft 3. As a result, a better positioning is achieved than would be possible in the case of single coils.

In the present embodiment according to the invention the number of coils amounts to four with the two coil pairs 9', 9" disposed at right angles to one another, whilst the rotor 5 has one pair of poles.

Because of miniaturization of the components, the coils 9 can be energized by means of signals at TTL level as emitted by present-day computers.

The possibility of computer-controlled operation opens up numerous new fields of application for stepping motors such as, for instance, in displays. Such a display 12 (FIGS. 7 and 8) may be built up of a number of axially symmetric, spatial, image-forming elements 13 arranged according to a grid and it may be controlled with the aid of stepping motors 1, each element 13 being open on one side 14, thereby permitting a stepping motor 1 according to the invention to be placed in the aperture 14, whilst each element 13 is also provided with a number of side faces 15, each of which bears its own pattern, and each element 13 is connected at the end 16 situated opposite the open side 14 to the rotor 5 of the stepping motor 1 whose rotor shaft 3 coincides with the axis of rotational symmetry of the element 13, the arrangement being such that each image-forming element 13 has its own stepping motor 1.

By way of example, FIGS. 7 and 8 are sectional views of part of a display 12 designed on the above lines. The elements 13 are spaced apart from each other in the display 12 at such a distance that sufficient clearance 17 is allowed for the elements to rotate freely. In order to ensure a regular pattern, some clearance 17' has also been created between stepping motors 1, when viewed along the line of rotor shaft 3.

In the embodiment of the display here described, the elements 13 are prisms, specifically prisms with four side faces 15 and square top and bottom faces 14, 16, or, to be still more exact, cubes. These cubes are arranged in rows and columns according to a grid with a square unit cell. Alternatively, however, the prisms may have six side faces or be rod-shaped or have a different configuration.

In a second embodiment of a display, as represented in FIGS. 9 and 10, the image-forming element 13 consists of four-faced pyramids whose base is an equilateral triangle. In order to obtain a smooth display front 18, the 120° stepping motors have been disposed at an angle to the display front 18 that is proportional to the apex of the four-faced pyramid.

In this second embodiment of the display, smaller clearances 17, 17' suffice and a larger number of elements can be used per unit area of display front 18, whereby the resolving power can be enhanced still further. The number of subpatterns per element 13 is only three, however, against four in the case of a cubic configuration.

If a five-faced pyramid with a square base is used in conjunction with 90° stepping motors, the requisite clearance increases somewhat, but so does the number of subpatterns available per element 13.

The overall pattern that is formed by the display 12 and built up of those side faces 15 of the image-forming elements 13 which constitute the display front 18 is composed of a number of subpatterns, which number agrees with the number of side faces 15 per image-forming element. In other words, the pattern on a side face 15 of an element 13 may be a local segment forming part of a larger picture, for instance a graphic representation decomposed into local segments, or it may be one color whereby, just as in color television, an infinite number of overall patterns can be produced from the elements 13. A requirement is, however, that each individual stepping motor can be controlled separately. In the decomposed graphic representations the number of display fronts 18 which may be produced is restricted to the number of side faces 15 per image-forming element 13, but on the other hand the control of the stepping motors 1 is simpler, because all stepping motors 1 receive the same command simultaneously or sequentially.

Besides the possibility of applying a stepping motor 1 according to the invention in positioning light objects, the stepping motor 1 may, in reversed usage, serve as an angular displacement meter through measurement of the changes in induction in the coils.

FIG. 11 depicts an electric diagram in which four connecting plugs 10 are used and two coils 9 are invariably connected in series. In this set-up it is, however, a prerequisite for certain positions of the stepping motor 1 to reverse the direction of the current in coils 9.

FIG. 12 represents an electric diagram in which the four coils 9 are connected to a common central connecting plug 10'. Each desired rotation of the rotor 5 can be brought about by supplying current pulses to one or two of the connecting plugs 10 without any necessity to reverse the direction of the current in any one coil.

I claim:

1. A stepping motor provided with a permanently magnetized rotor disc mounted on a shaft and with at least one coil for the excitation of a magnetic field, characterized in that each coil has been wound in a plane, in which the normal to the windings of each coil is perpendicular to the rotor shaft and in which the rotor disc intersects each coil-winding plane, wherein each coil is wound about a cylindrical cage construction which is disposed concentrically around the rotor.

2. A stepping motor provided with a permanently magnetized rotor disc mounted on a shaft and with at least one coil for the excitation of a magnetic field, characterized in that each coil has been wound in a plane, in which the normal to the windings of each coil is perpendicular to the rotor shaft and in which the rotor disc intersects each coil-winding plane, characterized in that the coils are air-core coils, and that the rotor and coils are surrounded by an annular soft-iron casing.

3. A stepping motor according to claim 1, characterized in that rotor and coils are surrounded by an annular soft-iron casing.

4. A stepping motor provided with a permanently magnetized rotor disc mounted on a shaft and with at least one coil for the excitation of a magnetic field, where each coil has been wound in a plane, in which the normal to the windings of each coil is perpendicular to the rotor shaft and in which the rotor disc intersects each coil-winding plane, characterized in that the coils are present in an even number and disposed two by two in parallel with one another on both sides of the rotor shaft, whilst the coil pairs are symmetrically spaced around the 360° circumference encircling the rotor shaft.

5. A stepping motor according to claim 4, characterized
   in that the number of coils amounts to four with the two coil pairs disposed at right angles to one another, whilst the rotor has one pair of poles.

6. A stepping motor according to claims 1, 2 or 4, characterized in that the coils can be energized with very small current pulses.

7. A display built up of a number of axially symmetric, spatial, image-forming elements arranged according to a grid and controlled with the aid of stepping motors, characterized in that each element has an aperture on one side, thereby permitting a stepping motor rotor to be placed in the aperture, whilst each element is provided with a number of side faces, each of which bears its own pattern, whilst each element is connected at the end situated opposite the open side to the rotor of the stepping motor, whose rotor shaft coincides with the axis of rotational symmetry of the element, the arrangement being such that each image-forming element has its own stepping motor, wherein the stepping motors for controlling the elements each comprises a permanently magnetized rotor disc mounted on a shaft and with at least one coil for the excitation of a magnetic field, each coil having been wound in a plane, in which the normal to the windings of each coil is perpendicular to the rotor shaft and in which the rotor disc intersects each coil-winding plane.

8. A display according to claim 7, characterized in that the elements are spaced apart from each other in the display at such a distance that sufficient clearance is allowed for the elements to rotate freely.

9. A display according to claim 7 or 8, characterized in that the elements are prisms.

10. A display according to claim 9, characterized in that the elements are prisms with four side faces and square top and bottom faces.

11. A display according to claim 10, characterized in that the elements are cubes.

12. A display according to claim 11, characterized in that the cubes are arranged in rows and columns according to a grid with a square unit cell.

13. A display according to any one of claims 1 or 8, characterized in that the pattern on a side face of an element forms a local segment of a larger representation.

14. A display according to any one of claims 7 or 8, characterized in that the pattern on a side face of an element has one color.

15. A stepping motor according to claim 4, characterized in that the coils are air-core coils.

* * * * *

UNITED STATES PATENT AND TRADEMARK OFFICE
CERTIFICATE OF CORRECTION

PATENT NO. : 4,831,293

DATED : May 16, 1989

INVENTOR(S) : Krop

It is certified that error appears in the above-identified patent and that said Letters Patent is hereby corrected as shown below:

Col. 6, line 9: replace "claims 1" with --claims 7--.

Signed and Sealed this

Thirtieth Day of April, 1991

Attest:

HARRY F. MANBECK, JR.

Attesting Officer

Commissioner of Patents and Trademarks